TELEPHONE MESSAGE-WAITING MONITORING DEVICE

Filed Feb. 28, 1964 2 Sheets-Sheet 1

INVENTOR.
CURTIS H. APPLEBAUM
BY
ATTORNEY

May 16, 1967 C. H. APPLEBAUM 3,320,368

TELEPHONE MESSAGE-WAITING MONITORING DEVICE

Filed Feb. 28, 1964 2 Sheets-Sheet 2

INVENTOR.
CURTIS H. APPLEBAUM
BY
ATTORNEY

United States Patent Office 3,320,368

Patented May 16, 1967

3,320,368

TELEPHONE MESSAGE-WAITING MONITORING DEVICE

Curtis H. Applebaum, Pasadena, Calif., assignor, by direct and mesne assignments, of forty percent to G. J. McGrath, Mankato, Minn., thirty percent to Curtis H. Applebaum, Pasadena, Calif., and thirty percent to William B. Lagerquist, North Mankato, Minn.

Filed Feb. 28, 1964, Ser. No. 348,084
17 Claims. (Cl. 179—84)

This invention relates to telephone monitoring accessories and more particularly to a unique device of a compact, rugged character easily and simply associated with a telephone set and automatically responsive to ringing of the phone to actuate a signal apprising the user that a party has endeavored to reach him during his absence, the signal remaining active until it is positively acknowledged. The invention accessory utilizes solid state components which may be encapsulated in a casing sufficiently small to be housed within a conventional desk-type phone set and operated by a battery power source also housed within the phone set. A high sensitivity pick-up circuit responsive to the ringing signal includes a solid state switch effective to activate a signal lamp visible from the exterior of the phone and continuing in operation until acknowledged by the user who then acts to reset the accessory for a new operating cycle.

This invention has particular utility for phone subscribers or users in offices, living quarters or other rooms customarily serviced by a private switchboard. Switchboard operators are customarily busy people lacking time to check frequently with the person called to deliver a message arriving during his absence. Or the operator may forget to make further attempts to reach the person being called. A wide variety of phone installations are involved including hotels, motels, apartment buildings, offices and in fact any phone installation serviced by a switchboard.

This invention provides a positively operating monitor which is compact, simple, inexpensive and reliably designed to be easily incorporated directly within the phone set and operating automatically in response to ringing of the phone to activate a signal which remains activated until acknowledged and functioning to advise the user upon his return to the room that the switchboard operator has attempted to reach him. Accordingly, upon his return, the user notes the signal and immediately lifts the receiver and checks with the operator for any messages or information left with the switchboard operator. Preferably, the monitoring accessory utilizes solid state components notable for their ruggedness, reliability, extreme compactness and capability of operating in a highly effective and efficient manner with minimum power consumption. The ringing signal detector can take various forms and is activated either by or independently of any connection with the phone ringing circuit. Irrespective of the type of signal detector employed, the device utilizes an independent source of power for the signal means as batteries or a commercial power supply.

In a preferred embodiment the monitoring accessory is enclosed within an inconspicuous housing readily accommodated inside the phone set housing. The signal proper and its acknowledgment button are desirably supported separately within the phone housing with portions thereof extending through suitable openings. Power requirements for the signal are so small that small standard batteries may be accommodated inside the phone set. In other cases where it is desired to avoid the need for servicing and replacing the batteries a simple extension cord incorporating a step-down transformer can be connected to a commercial power supply outlet.

Accordingly, it is a primary object of the present invention to provide a telephone-message monitoring accessory of simple, inexpensive and highly reliable design and functioning automatically to activate a signal as an incident to ringing of the phone.

Another object of the invention is the provision of a simple, compact accessory readily installable within the interior of a standard phone set and including means responsive to ringing of the phone set to apprise the user that the phone has rung during his absence.

Another object of the invention is the provision of a phone monitoring signal device actuated automatically when a switchboard operator endeavors to signal a phone user and continuing to provide an activated signal until positively acknowledged.

Another object of the invention is the provision of a message-waiting monitoring device for telephones and including a manual reset device usable at any time to check the operativeness of the monitoring device.

These and other more specific objects will appear upon reading the following specification and claims and upon considering in connection therewith the attached drawing to which they relate.

Referring now to the drawing in which a preferred embodiment of the invention is illustrated.

Figures 1, 2:
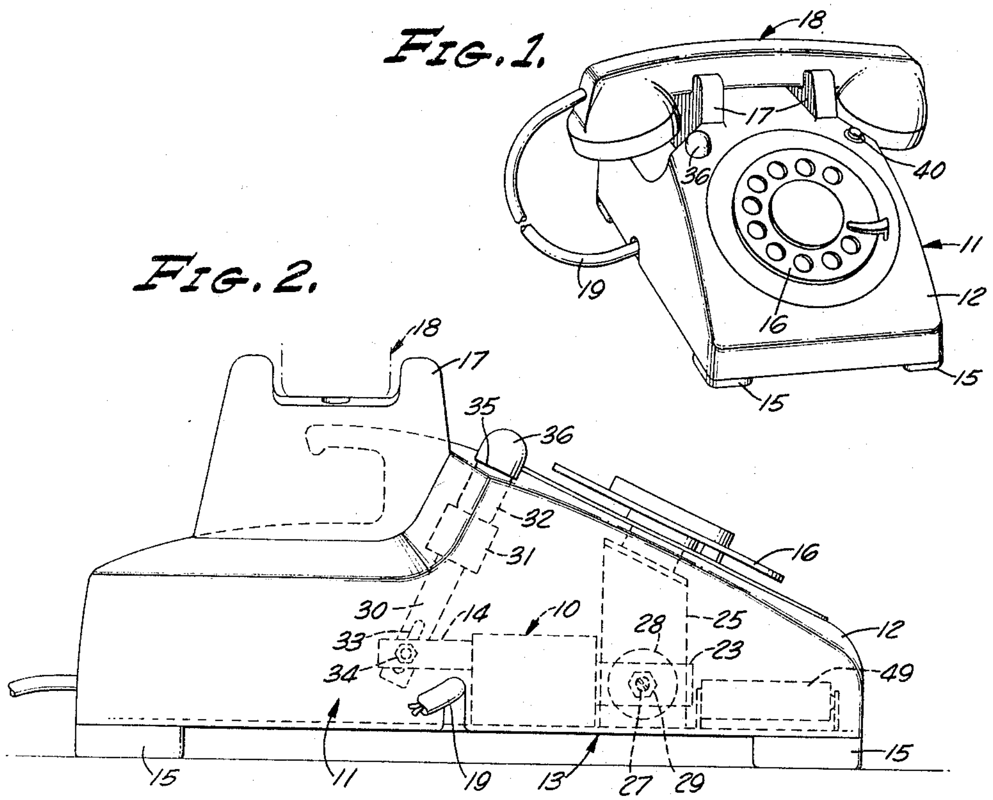
FIGURE 1 is a perspective view of a phone set having the invention monitoring device installed therein.
FIGURE 2 is a side elevational view on an enlarged scale in FIGURE 1 indicating the positions of the monitoring components interiorly of the phone housing.
Figure 3:
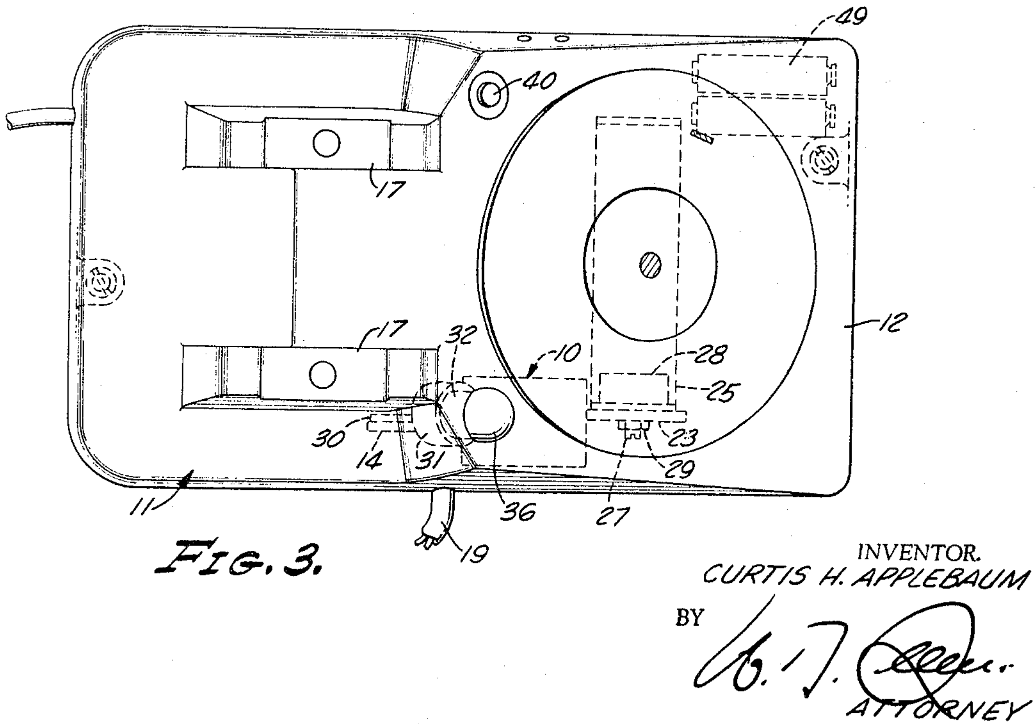
FIGURE 3 is a top plan view of FIGURE 2.
Figure 4:
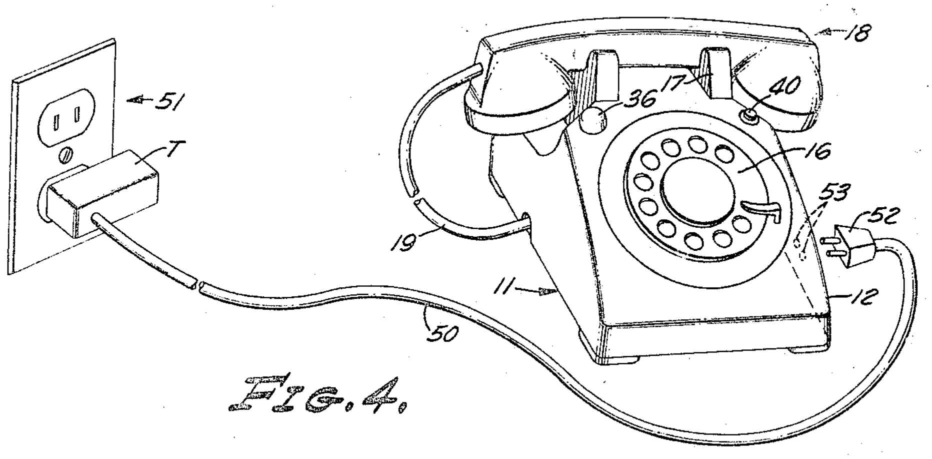
FIGURE 4 is a view similar to FIGURE 1 but showing an external power supply and its mode of attachment to the phone set.

Referring more particularly to FIGURES 1 to 3, there is shown a preferred embodiment of the present invention the major components of which are hermetically sealed or encapsulated within a housing 10 here shown as rigidly supported interiorly of the main casing 11 of a standard phone set. This phone set has an exterior insulated casing 12 telescoped over internal components supported on an underlying rigid base 13 provided with rubber feet 15. The forwardly facing inclined panel of housing 12 includes the customary subscriber dialing ring 16 used in known manner to complete calls to another subscriber. The upper rear portion of housing 12 is provided with cradle supports 17 for a hand-held combined microphone and receiver designated generally 18 and connected to the phone set by service cord 19.

Sealed casing 10 for the monitoring components includes a forwardly extending mounting bracket 23 and a rearwardly projecting bracket 14. As here shown, bracket 23 is rigidly secured to an inverted U-shaped bracket 25 of the phone set by the threaded tubular shank (not shown) surrounding the adjustable stem 27 of a potentiometer 28. A jam nut 29 threaded over the end of tubular shank serves to anchor both potentiometer 28 and casing 10 rigidly in place on bracket 23.

Projecting upwardly from bracket 14 is a supporting bracket 30 for socket 31 of signal lamp 32. The lower end of bracket 30 is slotted at 33 thereby permitting the lamp to be properly adjusted for alignment with an opening 35 in the front panel of phone casing 12. The bracket is clamped in this position by a bolt and nut 34. Desirably opening 35 is provided with a transparent protective dome 36 through which the signal lamp is visible when energized.

A second opening provided in the upper right hand corner of the phone housing supports a reset button 40 understood as normally held in open position by a suitable spring and having purposes to be described below.

Figure 5:
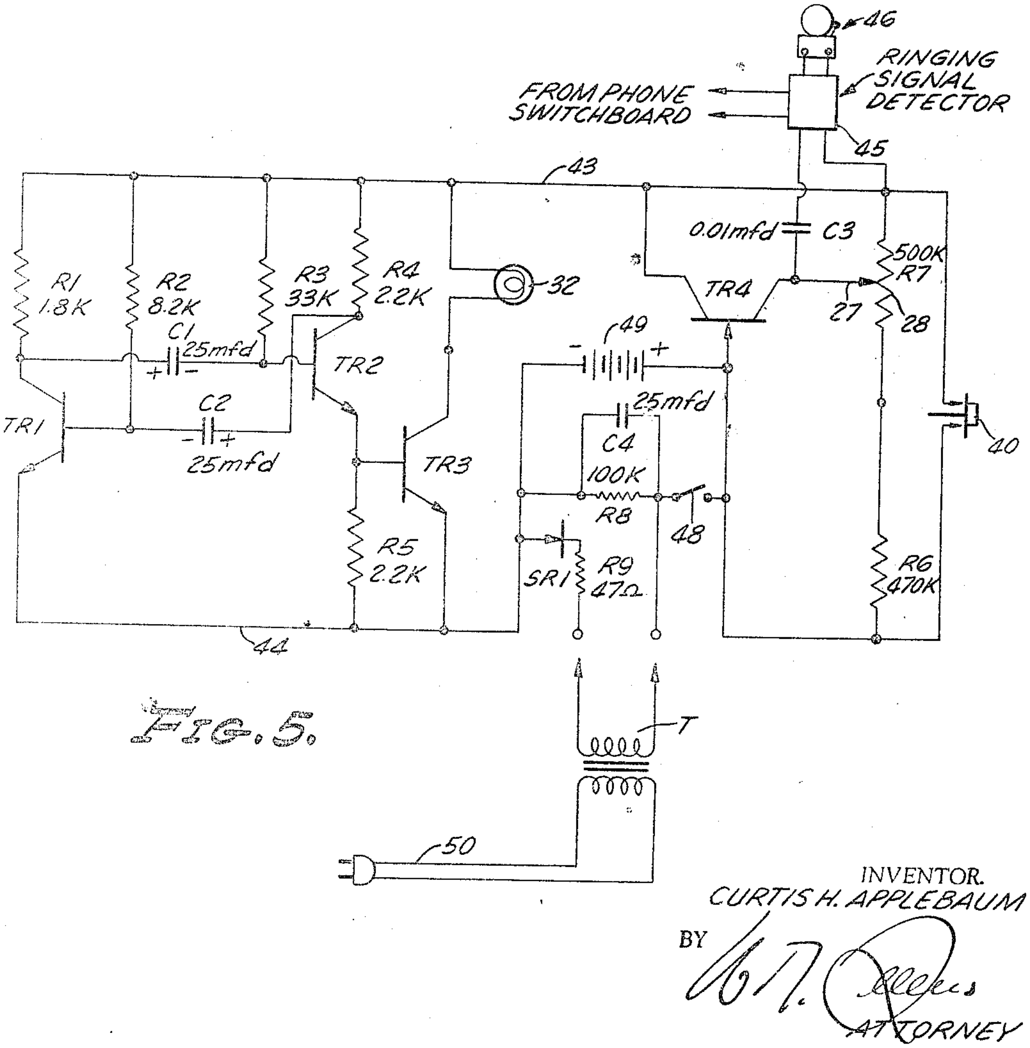
FIGURE 5 is a schematic of the components of the monitoring device.

Referring to FIGURE 5, there is shown a schematic of the solid state electrical components for the message-waiting monitoring accessory. It is pointed out that the components on the left half of the schematic function when activated to energize signal lamp 32 intermittently; whereas, the components in the right hand end of the schematic include a ringing signal detector and a relay responsive functioning to activate the flashing portion of the circuit. The midportion of the circuit functions to convert A.C. power to D.C. power when it is desired to avoid batteries to power the device.

Referring first to the ringing signal detector and the relay portion of the circuit, it is pointed out that these components are connected between positive bus 43 and negative bus 44 and include silicon controlled rectifier TR4, capacitor C3, potentiometer 28 (R7) and resistor R6, the normally open push button 40, and a ringing signal detector designated generally 45. This detector is located within the phone set in close proximity to the phone set ringing device 46. It will be understood that the ringing signal detector may comprise a suitable inductive pickup coil of a well known type located in close proximity to the lead wires extending between the phone switchboard and the phone set. The signal detector may also be connected directly in circuit with ringer 46 or the ringing signal detector may be merely a microphone pickup in close proximity to bell 46 and producing an output signal effective to operate the relay supplying power to the flasher components in the left-hand side of the schematic shown in FIGURE 5.

The power converter components for use when the device is to be energized from an A.C. power supply including a silicon rectifier SR1, resistors R8 and R9, capacitors C4 and a normally open switch or connector link 48. This switch is open whenever the battery supply is being used but is closed when the batteries are absent. The A.C. power supply includes a transformer T connected in a service cord 50 having the usual plug insertable in a standard commercial power outlet 51. The other end of the service cord may be connected directly to a terminal strip mounted interiorly of the phone set or this strip may include electrical sockets for seating the pins of a male service plug 52. The pins of this plug may be inserted into the socket terminals through small openings 53 formed in the side of phone housing 12.

The flasher components cooperating to supply power to signal lamp 32 intermittently and shown in the left-hand half of the schematic, include transistors TR1, TR2, TR3, resistors R1, R2, R3, R4 and R5; and capacitors C1 and C2, all connected to one another between positive bus 43 and negative bus 44 in the manner indicated in FIGURE 5.

The operation of the described device is as follows, it being assumed that the device is using battery power 49. Immediately that a ringing signal is transmitted to ringer 46, this signal is detected by detector 45 and utilized to actuate the highly sensitive relay or silicon controlled rectifier TR4 to render this device conductive and permitting current to flow from battery 49 to bus wires 43, 44 thereby energizing the signal lamp flasher components. It will be understood that TR4 is thereafter maintained in a highly stable conductive condition by the current flow to the flasher components and that subsequent ringing of the phone set does not interfere in any way with its continuing conductivity.

Detector 45 produces an output potential which appears between lines 43 and 27 as well as across the emitter-gate of the silicon controlled rectifier TR4 and acts to trigger the latter to conductive status. TR4 now conducts current supplied by battery 49, and remains conductive until the emitter-collector is short-circuited by closing switch 40.

When TR4 becomes conductive, current flows from battery 49 to lead 43 by way of the emitter-collector circuit of TR4, through R2, the base-emitter of TR1 or, alternatively, through R3 and the base-emitter of TR2, whichever starts conducting first. Assuming that TR1 starts conducting before TR2, the potential drop across R1 provides a transient pulse which, via C1, biases the base of transistor TR2 negative relative to the emitter and thus biases TR2 to non-conductive state. With TR2 non-conductive, capacitor C1 can charge and when the charge potential rises sufficiently, TR2 will be triggered to conductive state. When TR2 conducts, the sudden potential drop across R4 creates a transient which, via C2, biases the base of transistor TR1 negative, and makes TR1 non-conductive. Capacitor C2 charges, and when that charge potential gets high enough, TR1 is again biased to conductive state. When TR1 conducts, C2 discharges, and when TR2 conducts, C1 discharges. Thus conduction shifts from one to the other of TR2 and TR1, alternately and in repetitive cycles.

When transistor TR2 conducts, the potential on the base of TR3 rises from the negative lead value to a more positive value, i.e., goes positive relative to the negative lead and, as a consequence, the base of transistor TR3 is biased positive relative to the emitter of TR3, and TR3 is thus rendered conductive. When TR3 conducts, the current energizes lamp 32. As soon as TR2 is thereafter rendered non-conductive, the base of TR3 falls to the negative lead potential removing the forward bias on TR3 and the latter stops conducting. The light "goes out." The action is repetitive, TR3 following TR2 in conducting and non-conducting cycles.

Typical suitable values for the various components are those indicated on the schematic although it will be understood that various other values can be employed. The values given by way of example cause the lamp to be energized about 15 percent of the time and at a relatively slow cycle found highly effective as an attention getter.

Repeated ringing of the phone as calls are received by the switchboard operator in nowise affects the operation of the flashing signal or interferes with the conductivity of switch TR4. Accordingly, the flashing signal remains in operation until the user returns to the room, takes note thereof and manually depresses button 40 to deactivate it. Immediately as this occurs, the components are in instant readiness for re-use provided, of course, the receiver is down so that the phone ringing circuit can be energized. The flashing signal indicates to the user that the phone has been rung and he accordingly checks with the switchboard operator to learn what message or messages may be waiting for him.

Before leaving the room for an extended period of time, the user may wish to make certain that the monitoring device is in proper operating condition. To check this fact he merely depresses button 40 completing a power circuit to the flasher subassembly and causing the lamp to light. This indicates that the components are in proper working condition and the user relaxes the pressure on button 40 and leaves with assurance that should the phone ring in his absence the flasher will be activated.

It is pointed out that adjustable member 27 of potentiometer 28 provides a sensitivity control for the highly sensitive silicon controlled rectifier TR4 and also provides a convenient sensitivity control to accommodate the relay to use with different pickup components in ringing signal detector 45. Power consumption is so small that two small batteries last approximately six months. Negligible heat is produced and no loading of the phone ringing circuit is involved. Servicing and maintenance are substantially eliminated by the use of highly reliable encapsulated solid state components.

While the particular telephone message-waiting monitoring device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Automatic signal mechanism adapted to be activated by the ringing of a phone and continuing to provide a signal indefinitely after the ringing signal has ceased, said signal mechanism comprising electrically energized signal means adapted to be located in close proximity to a phone and normally de-energized, power means for said signal means, and means free of moving parts for connecting said power means to said signal means to energize the same including silicon controlled rectifier means and means responsive to the ringing of the phone in proximity to said signal mechanism to activate said power connecting means indefinitely and irrespective of the discontinuance of the ringing operation.

2. Automatic signal mechanism operable to apprise a phone user that a party has endeavored to phone him during his absence, said signal mechanism being normally deactivated and being responsive to ringing of the phone to place said mechanism in operation until acknowledged, said mechanism comprising normally inactive signal means in close proximity to the phone, normally inactive power means for energizing said signal means, and means including solid state means free of moving parts operable to connect said power means to said signal means for an indefinite period in response to a momentary ringing signal and including means responsive to ringing of said phone to provide a momentary activating signal to said power connecting means.

3. Automatic signal mechanism as defined in claim 2 characterized in that said signal means includes means operable to energize the same in a repetitive cycle until acknowledged.

4. Automatic signal mechanism as defined in claim 2 characterized in that said signal means is operable to provide a continuing intermittent attention-attracting visible signal when operation of said signal means is initiated.

5. Automatic signal mechanism as defined in claim 3 characterized in the provision of reset means positioned adjacent the phone being served thereby and manually operable in deactivate said signal means.

6. Automatic signal mechanism as defined in claim 3 characterized in the provision of means positioned adjacent the phone being served thereby and manually operable to activate said signal means momentarily to check the operability of said signal mechanism from time to time and before the phone user leaves the room.

7. Automatic signal mechanism operable to apprise a phone used that a party has endeavored to phone him during his absence, said signal mechanism being normally deactivated and being responsive to ringing of the phone to place said mechanism in operation until acknowledged, said mechanism including normally inactive signal means operable when activated to provide an intermittent attention-attracting visual signal, solid state means free of moving part having a power source independent of the phone circuit and being operatively connected to said signal means to activate the latter from said power source under predetermined conditions and including means responsive to ringing of a phone with which said signal mechanism is associated to operate said solid state means and thereby activate said intermittently operating signal means for a prolonged period of time, and manually operable means for restoring said solid state means to its original condition thereby deactivating operation of said signal means.

8. A self-contained automatic signal mechanism operable to apprise a phone user that a party has endeavored to phone him during his absence and readily mountable with a phone set to receive an activating signal therefrom in response to ringing of the phone, said signal mechanism including a signal lamp coupled in circuit with normally deactivated circuit means for energizing said lamp momentarily in an intermittent cycle, power means independent of the phone circuit normally open solid state switch means for connecting said power means to said circuit means and for continuing the power connection in response to a momentary operating signal, and means connected to said solid state switch means and responsive to momentary ringing of a phone associated therewith to provide a momentary operating signal to close said solid state switch means.

9. Signal mechanism as defined in claim 8 characterized in that said signal lamp is adapted to be located closely adjacent the phone in a position easily visible to one having a view of the phone.

10. Signal mechanism as defined in claim 8 characterized in that said self-contained mechanism is free of moving parts and encapsulated within housing means of a size readily accommodated within the casing of a conventional desk-type phone set, said housing means including bracket means supporting said signal lamp in position to project into an opening in said phone housing means.

11. Signal mechanism as defined in claim 8 characterized in that said solid state switch means includes adjustable means for varying the sensitivity thereof to render the same responsive to switch operating pulses of different magnitudes.

12. In combination, a desk-type phone having a main housing with at least one opening through the wall thereof, automatic signal mechanism mounted in said main housing having a visual signal supported in one of said openings, a manually operable reset switch, circuit means connected to said visual signal and operable independently of the telephone line circuit when activated to actuate said signal intermittently until deactivated, a source of power, solid state switch means for connecting said source of power to said signal circuit means to activate the latter for continuous operation in response to an initiating signal pulse of brief duration, means responsive to ringing of said phone to provide said solid state switch means with an initiating signal pulse, and means connecting said reset switch to said signal mechanism and operable upon operation of said reset switch to deactivate the operation of said signal circuit means.

13. The combination defined in claim 12 characterized in that said power source includes step-down transformer means connectible to a commercial A.C. power source, and converter means connected between said signal mechanism and said step-down transformer means for converting A.C. to D.C.

14. The combination defined in claim 13 characterized in that said transformer means is located exteriorly of said phone and is connected to said signal mechanism by service conductor means extending through the main housing for said phone.

15. The combination defined in claim 12 characterized in that said power source comprises self-contained battery means located within the main housing of said phone.

16. The combination defined in claim 12 characterized in that said phone main housing has dialing means on the upper forward portion thereof and a pair of openings located opposite adjacent quadrants of said dial, said signal means and said reset switch being mounted in respective ones of said pair of openings and in convenient viewing and operating positions closely adjacent the rim of said dial.

17. The combination defined in claim 12 characterized in that said reset switch is manually operable in combination with said power source and said circuit means so long as said solid state switch means is deactivated to test said mechanism by energizing said signal means momentarily during each operating cycle of said reset switch thereby to indicate that said signal mechanism is in readiness to respond to ringing of said phone.

References Cited by the Examiner

UNITED STATES PATENTS

| | | | |
|---|---|---|---|
| 2,477,918 | 8/1949 | Wortman et al. | 179—84 |
| 2,562,069 | 7/1951 | Stein et al. | 179—84 |
| 2,572,814 | 10/1951 | LaPorte | 179—84 |
| 2,616,972 | 11/1952 | McNutt | 179—84 |
| 3,050,592 | 8/1962 | Burgener | 179—84 |

KATHLEEN H. CLAFFY, *Primary Examiner.*

H. ZELLER, *Assistant Examiner.*